(12) United States Patent
Eberle et al.

(10) Patent No.: US 11,831,114 B2
(45) Date of Patent: Nov. 28, 2023

(54) BRUSH HOLDER AND SUPPORTING ROD DEVICE MATING TOGETHER

(71) Applicant: MERSEN Osterreich Hittisau Ges.m.b.H, Hittisau (AT)

(72) Inventors: Wolfgang Eberle, Sibratsgfäll (AT); Klaus Greiderer, Andelsbuch (AT)

(73) Assignee: MERSEN Osterreich Hittisau Ges.m.b.H, Hittisau (AT)

( * ) Notice: Subject to any disclaimer, the term of this patent is extended or adjusted under 35 U.S.C. 154(b) by 7 days.

(21) Appl. No.: 17/442,492

(22) PCT Filed: Feb. 27, 2020

(86) PCT No.: PCT/EP2020/055124
§ 371 (c)(1),
(2) Date: Sep. 23, 2021

(87) PCT Pub. No.: WO2020/253998
PCT Pub. Date: Dec. 24, 2020

(65) Prior Publication Data
US 2022/0173563 A1      Jun. 2, 2022

(30) Foreign Application Priority Data
Jun. 18, 2019   (EP) .................................... 19181031

(51) Int. Cl.
*H01R 39/38*         (2006.01)
*H01R 39/08*         (2006.01)
(Continued)

(52) U.S. Cl.
CPC ........... *H01R 39/385* (2013.01); *H01R 39/08* (2013.01); *H01R 39/42* (2013.01); *H01R 39/62* (2013.01); *H02K 5/141* (2013.01)

(58) Field of Classification Search
CPC ...... H01R 39/385; H01R 39/08; H01R 39/42; H01R 39/62; H02K 5/141
See application file for complete search history.

(56) References Cited

U.S. PATENT DOCUMENTS 3,387,155 A * 6/1968 Krulls .................... H02K 5/141
                                                          310/239
10,199,790 B2 * 2/2019 Cutsforth ............... H01R 43/14
(Continued)

FOREIGN PATENT DOCUMENTS

FR    2759215 A1 *  8/1998 ............. H01R 39/42
GB    1386383 A  *  3/1975 ........... H01R 39/385

OTHER PUBLICATIONS

English translation of FR-2759215-A1 (Year: 1998).*
International Search Report for PCT/EP2020/055124 dated May 6, 2020.

*Primary Examiner* — Tulsidas C Patel
*Assistant Examiner* — Joshua Kiel M Rodriguez
(74) *Attorney, Agent, or Firm* — Sughrue Mion, PLLC

(57) ABSTRACT

A brush assembly (100) for a slip ring assembly of a rotating electrical machine, having at a brush holder (120) defining a cage into which a brush (103) slides; and a rod (101) extending along a second axis (D2) parallel to the first axis, for supporting the brush holder. One of the rod and the brush holder defines a recess (121), the other has a portion sized to be received into the recess the mating portion (105), the recess defined by a first wall (123, 124) disposed for abutment against the mating portion when, the mating portion received in the recess, the brush holder is driven longitudinally along the rod parallel to the second axis. The recess is defined by a second wall (122) disposed for abutment against mating portion when, the mating portion received in the recess, the brush holder is driven tangentially around the second axis.

19 Claims, 9 Drawing Sheets

(51) Int. Cl.
*H01R 39/42* (2006.01)
*H01R 39/62* (2006.01)
*H02K 5/14* (2006.01)

(56) References Cited

U.S. PATENT DOCUMENTS

2007/0007846 A1* 1/2007 Niimi .................. H01R 39/385
310/239
2009/0072656 A1* 3/2009 Eisert .................. H01R 39/385
310/244

* cited by examiner

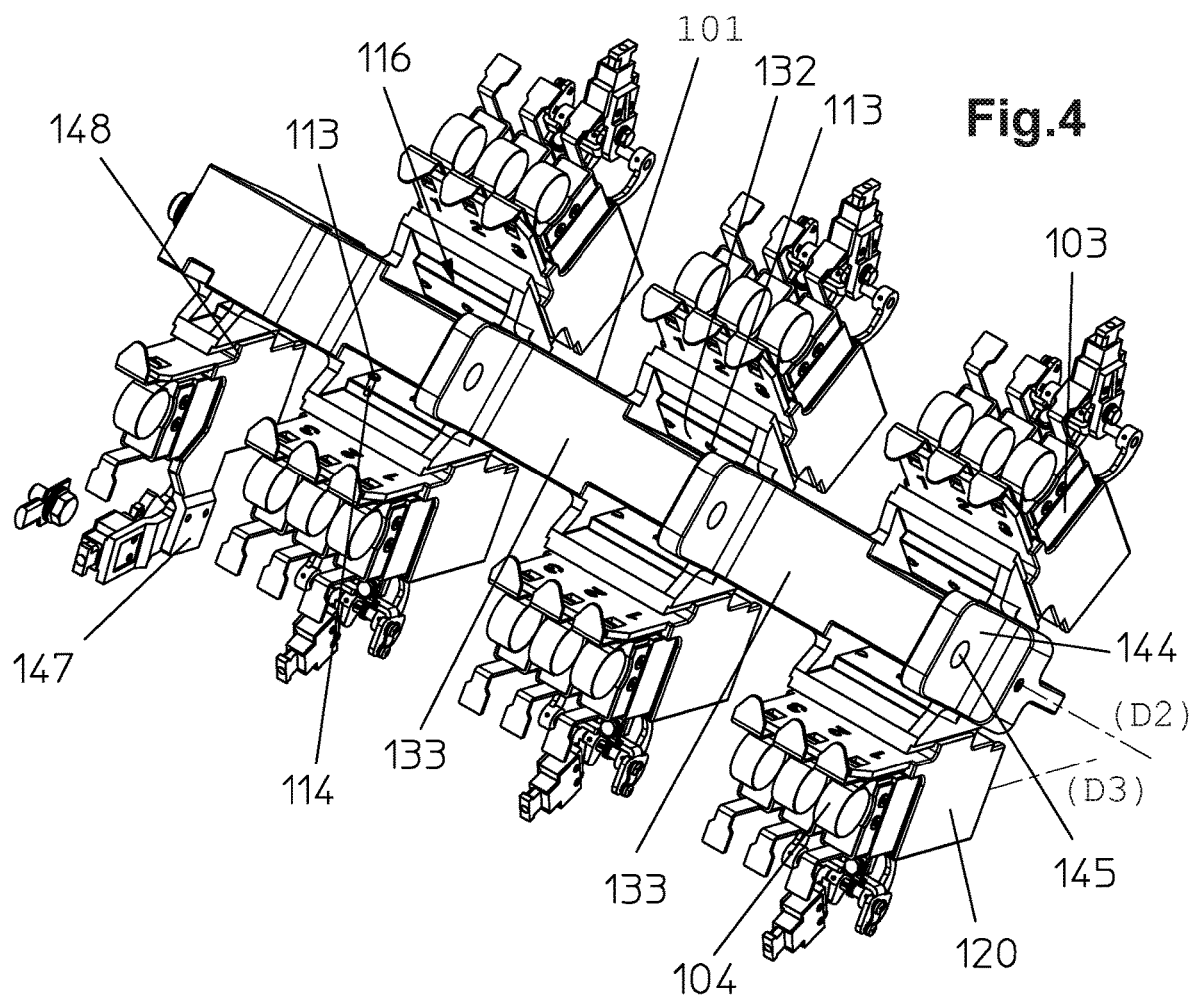
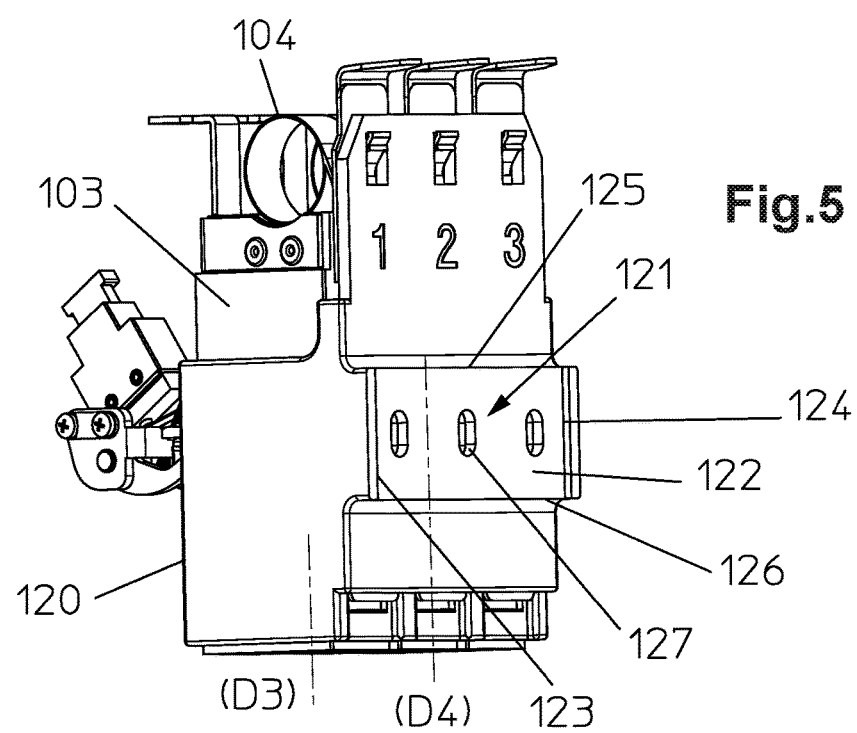

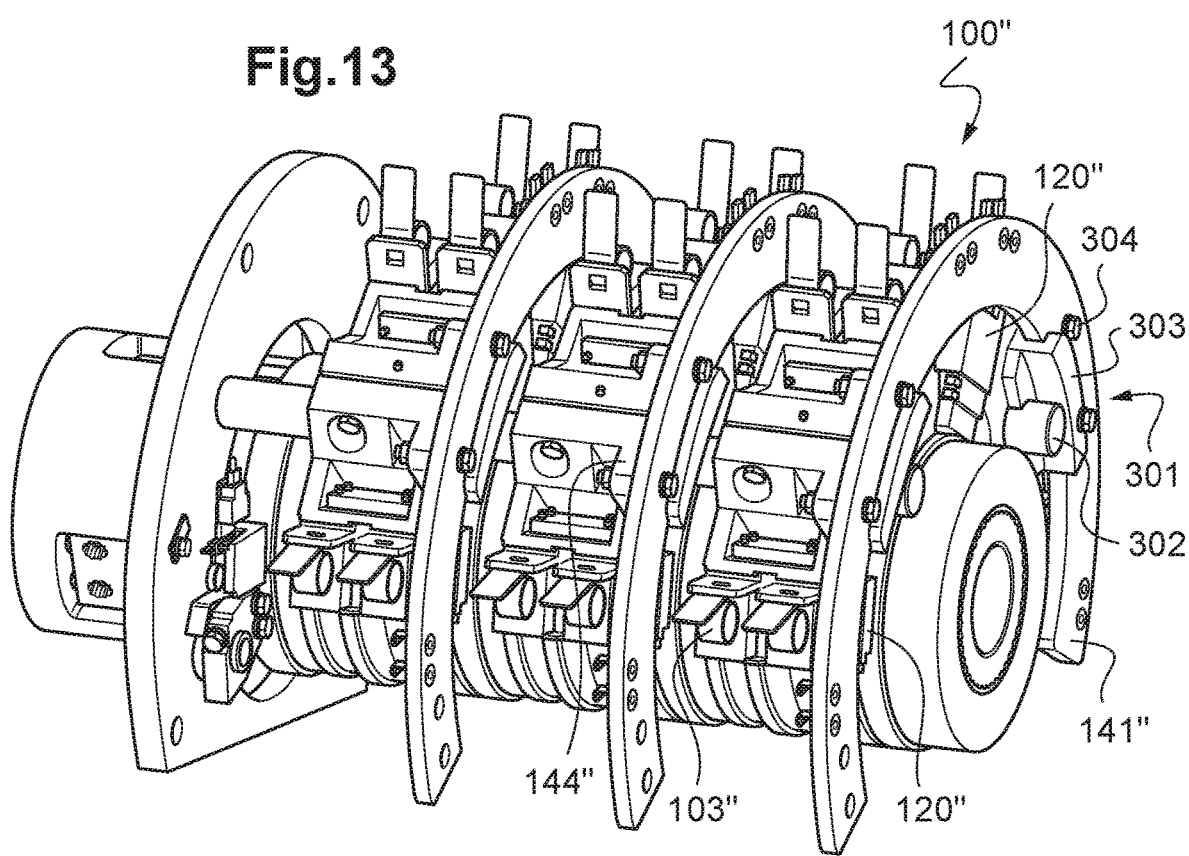
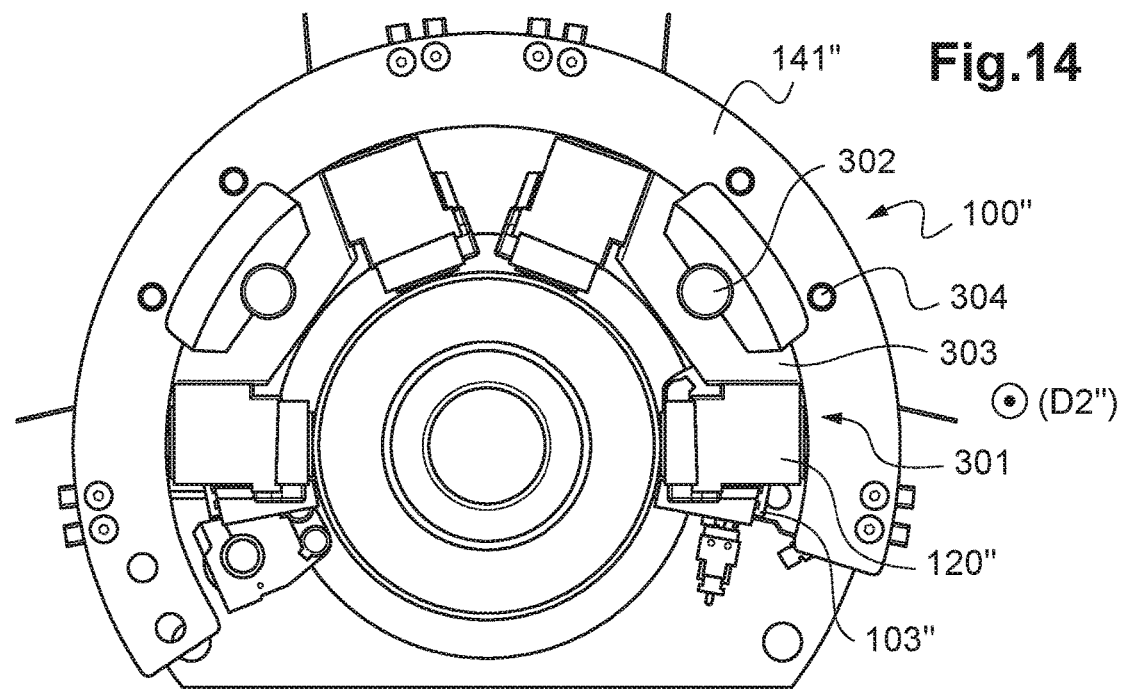

BRUSH HOLDER AND SUPPORTING ROD DEVICE MATING TOGETHER

CROSS-REFERENCE TO RELATED APPLICATIONS

This application is a National Stage of International Application No. PCT/EP2020/055124 filed Feb. 27, 2020, which claims priority under U.S.C. § 119(a) to European Patent Application No. 19181031.6 filed on Jun. 18, 2019.

The invention concerns current transfer between a fixed element and a mobile element of a rotating electrical machine, e.g. a generator, more particularly a brush assembly of a slip ring unit.

FIG. 1 is an exploded view of a prior art brush assembly, wherein brush holders 1 are mounted on partially circular (e.g., semi-circular) metal plates (said rockers) 2, 2', 2".

Each brush holder defines a cage onto which a brush 6 is slidably received, and comprises a spring element 7 that pushes this brush 6 such that its end slides against a cylindrical surface 5 of a conductive ring, also known as slip ring. Current flows through the brush 6 to/from the conductive ring 5. The current flowing through the brush 6 also flows through the rocker 2, 2' or 2" onto which the corresponding brush holder 1 is mounted.

Each rocker 2, 2', 2" corresponds to a phase.

The rockers 2, 2', 2" are supported by isolated steel bolts 3 the end of which are received in insulators 4.

The insulators 4 may be made of bulk moulding compound (BMC) material.

The rockers 2, 2', 2" are thus electrically isolated one from the other.

Since the brush holders 1 are mounted onto rockers 2, 2', 2", cooling the brushes may be relatively difficult to achieve.

FIG. 2 is an exploded view of another prior art brush assembly, wherein each brush holder 12 is clamped onto a connecting rod 13, thus allowing to make the assembly easier to cool.

Each connecting rod 13 has a circular section and each brush holder is mounted onto the rod with a double clamping system.

Each connecting rod 13 comprises a steel bolt surrounded by an insulated tube. The insulated tube may be made of glass textolite.

Further, insulating discs 15 may be provided between the phases to increase the creeping distance.

The current flowing through each brush also flows through wires (not represented) that are connected onto the brushes 12. These wires are supported by a wiring bracket 16.

There is a need for a brush assembly allowing both uniform cooling and quick installation.

There is provided a brush assembly for a slip ring assembly of a rotating electrical machine, for supporting at least one brush electrically contacting a cylindrical surface of a conductive ring of the slip ring assembly, one of the brush assembly and the conductive ring having a rotational movement around a first axis extending along a longitudinal direction, the brush assembly comprising:

at least one brush holder, said brush holder defining at least one cage into which at least one brush may be slidably received, said brush holder comprising a spring element arranged and installed so as to apply a force onto the brush when said brush is received in the cage so as to push said brush against the cylindrical surface of the conductive ring, said force having a component that is parallel to a radial direction with regards to the first axis;

at least one rod device extending along a second axis the direction of which having a component that is parallel to the first axis, for supporting the brush holder, wherein one of the rod device and the brush holder defines at least one recess, the other one of the brush holder and the rod device comprises a portion that is sized to be received into the recess, said mating portion, said recess is defined by a first wall disposed for abutment against the mating portion when, said mating portion being received in said recess, the brush holder is driven along said rod device in a longitudinal direction parallel to the second axis, said recess is defined by a second wall disposed for abutment against mating portion when, said mating portion being received in said recess, the brush holder is driven around said rod device in a tangential direction around the second axis.

The rotating electrical machine may be synchronous or asynchronous.

The rotating electrical machine may for example comprise a doubly-fed electric machine.

The rotating electrical machine may be configured as a motor or an electric generator.

The rotating electrical machine may be arranged for power transfer or for signal transfer.

The current may be alternating current (AC) or direct current (DC).

The rotating electrical machine may be used in wind turbines, steam turbines, gas turbines, elevators, crushers, ventilators, pumps, alternators, etc.

The conductive ring and/or the brush assembly may be rotating, provided that there is a relative rotational movement between the conductive ring and the brush.

The brush may comprise a block made of graphite, metal, and/or other components, a shunt and/or a terminal.

The brush may alternatively be a fiber brush.

The rod device may be mounted onto a ring support surrounding at least part of the conductive ring. The ring support may for example comprise a circle segment metal plate.

The rod device may advantageously be arranged such that, on at least 80% of its length, for each of its sections in planes perpendicular to the second axis, its highest dimension in this section is less than 3 times its smallest dimension in this section, advantageously less than twice its smallest dimension, advantageously, less than 150% of his smallest dimension. That is, the rod element may be relatively thick so as to be able to withstand the weight of the brush holder.

The rod device may advantageously comprise only a single rod element. This rod element thus extends along the second axis.

The rod element may define one of the recess and the mating portion.

Alternatively, the rod device may comprise a plurality of pieces assembled together in a removable manner.

For example, the rod device may comprise a rod extending longitudinally along the second axis and at least one support element removably mounted onto this rod.

The rod may have a circular section along its whole length, or not.

Advantageously, the at least one support element may define the recess or the mating portion of the rod device, that is the brush holder mates with the rod device via this support element mounted onto the rod.

Advantageously, the at least one support element mounted onto the rod may be made of insulating material.

Alternatively, the at least one support element mounted onto the rod may comprise at least one metal part and at least one insulating portion, e.g. a portion defining the recess or the mating portion.

When the rod has a circular section along its whole length, the at least one support element may be arranged so as to be clamped onto this rod.

The rod may be made of metal, e.g., steel, thus allowing improved mechanical resistance, or not. For example, the rod may be made of insulating material such as plastic.

When the section of the rod is not circular along its whole length, the rod may advantageously be arranged so as to mate with the at least one support element, e.g., by means of a further recess/mating portion system.

The brush holder is mounted onto the rod device.

The brush holder may be installed onto a periphery of the rod device, not at one of its longitudinal ends.

The brush holder may define a single cage or a plurality of cages, e.g. two or four cages.

The spring element may for example comprise a leaf spring, a cantilevered spring, a torsion spring, or else.

The first axis and the second axis may for example be parallel or substantially parallel (an angular deviation smaller less than 20°, advantageously smaller than 10°).

The first wall and/or the second wall may advantageously be smooth, i.e., without threads.

The recess of the rod device (or the brush holder) is limited by at least two walls for limiting the movements of the brush holder (or, respectively, the rod device) with the mating portion of the brush holder (or the rod device) within the recess: a first wall for stopping the brush holder driven in a direction parallel to the second axis, and a second wall for stopping the brush holder when driven in a tangential direction.

The recess may open toward a direction that has a component parallel to a local radial direction with regards to the first and/or second axis, If the recess is defined within the rod device, e.g. within the rod element, the recess opens in a direction that has a component parallel to the local radial direction with regards to the second axis. If the recess is defined within the brush holder, the recess opens in a direction that has a component parallel to the local radial direction with regards to the second axis when the brush holder is installed on the rod device with the mating portion received within the recess. That is, in both cases, the brush holder is brought from aside when installed on the rod device.

Such brush assembly may allow installing and adjusting the brush holder quite easily and quickly, because there may be less radial and longitudinal adjustments than with the brush assembly of FIG. 2, wherein the brush holder may be installed at any position onto the connecting rod.

Further, the brush assembly may be cooled uniformly more easily than the brush assembly of FIG. 1, because of its structure.

Further, the brush assembly may comprise a smaller number of pieces, and its design may be relatively simple.

Further, the brush may be replaced quite easily.

Further, standardization may be achieved relatively easily.

Advantageously, the recess and the mating portion may have complementary sections, i.e., the mating portion is received without any play (other than the assembly clearance) in the longitudinal direction (that is, the direction parallel to the first and/or second axis) and in the tangential direction (that is, a local direction, tangential to rotation around the first axis or the second axis).

Advantageously, the recess may have a section (in planes normal to a direction having a radial component) that is not circular, i.e. it is not possible to rotate the mating portion within the recess.

Advantageously, the recess may define two first walls opposing each other, thus allowing (when the other one of the brush holder and the rod device has its mating portion received in said recess) stopping the brush holder when driven longitudinally along said rod device in both directions along the second axis. The possible longitudinal movements are thus limited to a relatively short range, e.g. a play of less than one centimeter or less than one millimeter, depending on the size (along the longitudinal direction) of the mating portion that is received in the recess and of the distance between the two first walls.

Alternatively, the recess may comprise a single first wall, i.e., to install the brush holder on the rod device, a technician pushes the mating portion against this first wall, such that there is no longitudinal adjustment.

The at least one first wall may advantageously have at least one local normal vector (i.e., its normal direction in case of a planar wall) that has a component along the second axis (when the brush holder is installed on the rod device in case the recess is defined in the brush holder). For example, local normal vector or the normal direction may be parallel or substantially parallel (angular deviation less than 30°, advantageously less than 15°) to the second axis.

The at least one first wall may advantageously comprise a planar portion whose normal direction has a component along the second axis (when the brush holder is installed on the rod device in case the recess is defined in the brush holder), e.g. this normal direction may be parallel or substantially parallel to the second axis.

The at least one second wall may be arranged such that at least one of its local normal vector (i.e. its normal direction in case of a planar wall) has a component along the corresponding local tangential direction (when the brush holder is mounted on the rod device—if the brush holder defines the recess).

For example, the at least one second wall may be planar.

The at least one second wall may advantageously extend longitudinally (when the brush holder is mounted on the rod device—if the brush holder defines the recess).

The at least one second wall may be arranged such that at least one of its local normal vectors (i.e. its normal direction in case of a planar wall) has a component that is not parallel to the corresponding local radial direction, in particular when this at least one second wall extends longitudinally.

For example, at least one second wall may extend both longitudinally and radially.

For example, the recess may define two side second walls, upstanding from a bottom of the recess and opposing each other, thus allowing (when the other one of the brush holder and the rod device has its mating portion received in said recess) stopping the brush holder when driven tangentially along said rod device in both tangential directions. The possible tangential movements may thus be limited to a relatively short range, e.g. a play of less than one centimeter or less than one millimeter, depending on the size (along the tangential direction) of the mating portion of the brush holder that is received in the recess and of the distance between the two second walls.

The first wall(s) and/or the second wall(s) may be side walls, upstanding from a bottom wall of the recess, in direction(s) having a component that is parallel to the radial direction and/or to a direction that is perpendicular to the bottom wall (when the brush holder is mounted on the rod device—if the brush holder defines the recess).

The recess may for example be surrounded by walls preventing longitudinal and tangential movements.

In an embodiment, at least one second wall may be a bottom wall of the recess.

This bottom wall may be opposed to the opening of the recess.

This bottom wall may comprise at least one normal vector that has a component along the corresponding local tangential direction (when the brush holder is mounted onto the rod device if the recess is defined within the brush holder), so as to prevent tangential movement.

This bottom wall may have a non-circular section in a plane perpendicular to the second axis (when the brush holder is mounted onto the rod device if the recess is defined within the brush holder), e.g. a planar section, a V-shape section etc., thus forbidding tangential movement of the mating portion, in particular when the mating portion has an end that matches with the bottom wall, e.g. a planar end, an inversed V end, etc.

The mating portion of the rod device or the brush holder may comprise at least one end surface of an end wall that is outwards the rest of the rod device or the brush holder, respectively.

The mating portion may comprise side walls upstanding from this end surface toward the rest of the rod device or the brush holder, respectively.

Advantageously, the mating portion is arranged such that its end surface to be in surface contact with the at least one bottom wall of the recess when the mating portion is received within the recess. In particular, the side walls of the mating portion are high enough for the end surface to contact the bottom wall of the recess.

In this latter embodiment, wherein the at least one bottom wall prevents tangential movements, the recess may be surrounded by side walls, some of them possibly allowing also to prevent tangential movements, or alternatively the recess have only at least one first wall upstanding from the bottom wall(s).

The walls of the recess and/or of the mating portion may form edges between them, or alternatively may form fillets or rounded edges.

The recess may be defined within the brush holder, in which case the rod device, e.g., the rod element or a support element mounted onto a circular rod, may define a protruding portion that can be received within the recess of the brush holder. The protruding portion may protrude from a rod surface of the rod device and may extend in a direction that has a radial component with regards to the second axis.

Alternatively, the recess may be defined within the rod device.

For example, the recess may be defined between opposing walls of two pieces of the rod device. In another example, the rod device may comprise a single rod element that defines this recess.

When the recess is defined within the rod device, the mating portion of the brush holder may for example be at least part of a protruding portion protruding from the rest of the brush holder or be a part of a body of the brush holder. In this latter case, the size along the longitudinal direction of the portion of the brush holder that is received within the recess equals the size, along the longitudinal direction, of the brush holder itself.

When the rod device defines the recess, it is advantageous that, in any section of the rod device in a plane that is perpendicular to the second axis, the area of the recess do not represent more than 30% of the area of this section, thus avoiding weakening the rod device with a relatively empty section.

In particular, the recess may not be a through opening extending through a main rod section of the rod device.

Advantageously, for each section, in a plane perpendicular to the second axis, which is occupied by the recess, the recess may not reach a barycenter of this section of the rod device.

For example, when the recess extends towards the barycenter, the bottom of the recess may be earlier than this barycenter, e.g. the recess has a depth that is smaller than 80% of the depth of the barycenter, advantageously smaller than 50%.

For example, the recess may be defined aside the barycenter, advantageously aside the main rod section, thus avoiding weakening this main rod section with empty space.

The depth of the recess may be smaller than a highest dimension of a section of the rod device (in a plane that is perpendicular to the second axis, and at a longitudinal position corresponding to the longitudinal position of the recess), e.g. the recess may occupy less than 50% of the highest dimension of the section of the rod device (in a plane that is perpendicular to the second axis, and at a longitudinal position corresponding to the longitudinal position of the recess), advantageously less than 30%.

In case the rod device or the brush holder defines a protruding portion that is to be received into the recess, this protruding portion and the recess may have complementary, non-circular, sections.

Advantageously, the protruding portion defined on the rod device or the brush holder is not movable with respect to the rest of the rod device or the brush holder, respectively. The rod device or the brush holder may for example be made of a single piece (except the spring element for the brush holder that is typically a separate element).

The recess and/or the mating portion may for example have a cylindrical shape, a frusto-conical shape, in both cases with an axis having a component parallel to a direction radial with regards to the second axis), or else. For example, the recess may define the second walls at its bottom.

In case of a right cylindrical shape or a right frusto-conical shape, i.e. axis is perpendicular to the base, the base of the cylinder or of the cone (corresponding to the frusto-conical shape) may not be circular. For example, the base may be elliptic, rectangular, or else, thus forbidding the mating portion to rotate within the recess, or the recess to rotate around the mating portion.

Advantageously, the rod device may comprise at least a part that is made be of insulating material, thus allowing improving resistance to corrosion.

The insulating material may for example comprise plastic or composite, e.g. glass fiber reinforced polyester molding compound (BMC). BMC is advantageous also because of its heat deflection temperature, e.g. 200° or higher, which is much higher than a typical temperature of a slip ring unit.

The insulating material and the design of the rod device may be chosen so as to withstand high voltages, e.g. more than 400 V or more than 600 V, while maintaining insulation.

Advantageously, the rod device may comprise more than 10% in weight, e.g. more than 50% in weight, e.g. more than 90% in weight of insulating material, advantageously more than 95%, e.g. 100% in weight of insulating material.

Advantageously, the rod device may comprise more than 25% in volume, e.g, more than 70% in volume, e.g. more than 90% in volume of insulating material, advantageously more than 95%, e.g. 100% in volume of insulating material.

In an example, the rod element may comprise a core. This core may advantageously be made of metal. This core may advantageously be covered by insulating material on at least part of its length, preferably on its whole length.

Advantageously, the rod element may be made of insulating material.

The rod element may for example comprise more than 10% in weight, e.g, more than 50% in weight, more than 90% in weight of insulating material, advantageously more than 95%, e.g. 100% of insulating material, thus allowing improving resistance to corrosion, compactness and insulation between phases. This may be particularly interesting in case of exposure to fog salt.

The rod element may for example comprise more than 25% in volume, e.g, more than 70% in volume, e.g. more than 90% in volume of insulating material, advantageously more than 95%, e.g. 100% in volume of insulating material.

The rod element may advantageously comprise a single insulating piece, even when designed so as to support a plurality of brush holders.

The rod device, e.g., the rod element or more generally the part of the rod device that is made of insulating material, may for example be manufactured by injection molding of plastic or by another manufacturing process, e.g. pressing, 3D printing, machining, etc.

The skilled person would choose the insulating material depending on the manufacturing process, the expected voltage value etc.

Advantageously, and in particular when the rod device comprises a metal part, the brush assembly may be arranged such that mounting the brush holder on the rod device does not allow per se creating a path for the current possibly flowing through the brush to also flow (axially, that is in the direction of the second axis, or at all) through the rod device. Electrical connections with wires need to be settled.

Advantageously, the rod device may be arranged such that no possible metal part of the rod device electrically contacts the brush holder nor the brush when the rod device supports the brush holder. That is, the rod device may be arranged such that, when the rod device supports the brush holder, the surface of the rod device that contacts the brush holder and/or the brush is made of insulating material.

In particular, the recess or mating portion defined by the rod device may be made of insulating material.

Advantageously, the rod element or a metal rod onto which support element(s) is/are mounted, may comprise at least one metal portion, e.g. one or several wire(s), a metal cylinder etc, surrounded by insulating material, e.g., plastic. The insulating material may be part of an additional element mounted on the metal portion, e.g. a support element removably mounted on a metal rod. In another embodiment, the insulating material may be applied, e.g., molded, on the metal portion.

For example, the rod element may be manufactured by:
(a) providing a rod, e.g. a cylindrical rod, made of insulating material,
(b) placing at least one metal portion, e.g. at least one wire, onto the rod, while keeping each metal portion if several distant from the other(s),
(c) overmolding the rod plus metal portion(s) assembly with insulating material, e.g., plastic, so as to surround a length of the metal portion(s), and with a cast arranged such that the molded insulating material defines the recess or the mating portion, e.g. a protruding portion.

When a plurality of metal portions are provided, the insulating material may thus allows insulating the metal portions one from the others.

Advantageously, at least one of the rod device and the brush holder may define guiding means for guiding the brush holder in a direction that has a radial component with regards to the second axis and/or the first axis. The guiding means thus allow radial adjustment of the brush holder. Since the rod device may not be far from the conductive ring, it is therefore possible to adjust the distance from the brush holder and the cylindrical surface of the conductive ring.

In particular, the brush assembly may be arranged such that, when the rod device is installed, the guiding means allow guiding the brush holder in a direction that is relatively close from the radial direction with regards to the first axis or the second axis (an angular deviation smaller less than 20°, advantageously smaller than 10°).

In an embodiment, the recess having a planar bottom wall, the guiding means may allow guiding the brush holder in a direction that is relatively close from (an angular deviation smaller less than 20°, advantageously smaller than 10°) or parallel to a direction within the plane of the bottom wall.

The guiding means may comprise male and female elements sliding with regards to each other, one of these elements being defined by the rod device, e.g. by the rod element, and the other one by the brush holder.

For example, the guiding means may comprise a groove.

In an embodiment, the guiding means may comprise a groove defined within the rod device.

In another embodiment, the guiding means may comprise a groove defined within the brush holder.

The guiding means may comprise a tongue adapted to be slidably received within the groove.

For example, the guiding means may comprise a groove defined in the brush holder (or in the rod device) and a tongue protruding from the rest of the rod device (or from the brush holder, respectively).

In an embodiment, the female element may be defined within the rod device. The female element may protrude from the brush holder, or alternatively be part of the body of the brush holder.

The recess may for example form a groove, defined by the bottom wall and two opposing side walls upstanding from the bottom wall. That is, the recess further opens towards a side direction, parallel or substantially parallel to the two opposing first walls, at a single end or at both ends.

The brush holder and/or the rod device may be arranged so as to allow locking the brush holder onto the rod device, e.g., brush holder and/or the rod device may define hole(s), e.g. through-hole(s), for receiving threaded rod(s) of screw(s) of bolt(s).

The threaded rod(s) may advantageously be made of metal.

The brush assembly may of course comprise other locking means than threaded rods.

Advantageously, the rod device may be arranged so as to mechanically support means for power and/or data distribution, e.g.:
the rod device, e.g. the rod element, may have a shape that defines supports for wire, termination cable, connection element, conductive plate and/or other, to be installed on it, and/or power/data distribution means, e.g. a metal insert, may be integrated into the rod device, e.g. into the rod element.

Cabling path may thus be quite easy to install.

In case power/data distribution means are integrated into the rod element, the rod element may be manufactured by molding insulating material around a portion of the power/data distribution means.

The power/data distribution means may for example comprise a metal insert, a metal line, a printed circuit board (PCB), etc.

Advantageously, the brush assembly may further comprise at least one at least partially circular conductive plate that extends in a plane perpendicular to a line that has a component parallel to the first axis and the second axis, e.g. a line that is parallel or substantially parallel (angular deviation small than 20°, advantageously than 10°) to the first axis and/or the second axis.

The at least partially circular conductive plate may be a circle segment conductive plate, that is, it extends over 360°, or a partially circular conductive plate. In this latter case, it may extend for example from 20° to 359°, advantageously from 30° to 300°, e.g. from 40° to 120°.

Advantageously, the brush assembly may be arranged such that current flowing through the brush also flows through a corresponding at least partially circular conductive plate. Power connection may thus be relatively simple.

Advantageously, when the brush assembly comprises a plurality of at least partially circular segment conductive plates, the at least partially circular segment conductive plates may be electrically isolated one from the others. In particular, each at least partially circular conductive plate may correspond to a phase.

Advantageously, at least one rod device may be arranged so as to support, at least partially, at least one at least partially circular conductive plate. For example, the rod device, e.g. a rod element or a support element mounted onto a rod, may define upstanding wall(s), e.g. extending perpendicularly to the second axis, that define hole(s) for mechanical fixation to the at least partially circular conductive plate(s). For example, a rod element may be molded so as to define these upstanding walls with holes.

For example, at least one at least partially circular conductive plate may be supported by at least one (and possibly several) insulation support rod (distinct from the rod device) that extends in a direction that is parallel or substantially parallel (angular deviation small than 20°, advantageously than 10°) to the first axis and/or the second axis.

This/these insulation support rod(s) may provide an improved resistance to radial vibrations.

Alternatively, the at least one at least partially circular conductive plate may be supported by at least one rod device only.

In another embodiment, at least one at least partially circular conductive plate may not be mechanically supported by any rod device mechanically supporting a brush holder. This at least one at least partially circular conductive plate may for example be mechanically supported only by dedicated insulation support rod(s).

The at least partially circular conductive plate may be thinner and lighter than the rockers from prior art, since the brush holders are mechanically supported by the rod device.

Advantageously, the brush assembly may further comprise at least one connection element arranged for a plurality of wires be installed on it (advantageously, in a removable manner, e.g. by means of screws) so as to electrically contact each other.

Advantageously, this at least one connection element may be mounted onto at least one rod device, e.g. onto a rod element or onto a support element mounted onto a rod. At least one rod device may thus be arranged so as to mechanically support the connection element.

Advantageously, the rod device may define at least one planar portion close to (e.g. less than 20 centimeters, advantageously, less than 10 centimeters from) at least one recess or mating portion it defines.

The planar portion may advantageously have its normal direction with a component in a radial direction with regards to the second axis, e.g. parallel or substantially parallel to a radial direction.

Advantageously, the planar portion may define at least one, and preferably several, holes, for receiving e.g. screws, or bolts and nuts.

Such planar portion may allow fixing easily a connection element onto the rod device.

Advantageously, the at least one connection element may be installed onto at least one corresponding planar portion of the rod device.

Advantageously, at least one wire of the connection element is also connected (advantageously in a removable manner, e.g., by means of screws or bolts and nuts), by its other end, to a corresponding brush.

Installing the wires may thus qui performed quite easily for the costumer. There is no need to adapt the length of the wires.

Advantageously, the planar portion may have a same longitudinal position as the recess/mating portion the rod device also defines. Advantageously, the rod device may comprise at, at least one longitudinal end, preferably at a single end, fixing means arranged for a fixation onto a support, e.g., at least one, and preferably several slots or at least one, and preferably several holes for threaded rod(s) of screws or bolts.

The threaded rod(s) may advantageously be made of metal.

Having a plurality of fixing means may allow preventing rotation of the rod device.

Advantageously, the fixing means may be arranged so as to allow fixation at a single location and with a single angle with regards to the support. That is, no adjustment is needed when installing the brush assembly.

The brush assembly may comprise at least one support, e.g., a circular support, a generator hub provided by the costumer, etc., onto which the rod device is fixed.

Having a single support, e.g. a plate extending in a plane that is perpendicular or substantially perpendicular to the first axis and/or the second axis, allows an easier cooling by axial ventilation. Further, the number of pieces may be relatively small, so installation may be simpler.

Advantageously, the rod device, e.g., the rod element, may define a cavity defined by an outer wall, this outer wall defining at least one, and preferably several through-hole(s). That is a threaded rod, of a screw or a bolt, may go through this hole.

Advantageously, the brush assembly may further comprise a metal plate sized to be received within this cavity, and defining at least one, and preferably several hole(s), preferably through-hole(s), at position(s) corresponding to the position(s) of the through-hole(s) of the outer wall when the metal plate is received within the cavity. The threaded rod(s) may thus exert efforts onto the metal plate, thus ensuring strengthening the fixation.

The piece that is fixed by this/these threaded rod(s) may for example be a support, a connection element, or a brush holder.

It is advantageous that this piece be made of metal, because of the metal contacts between this piece and the threaded rod(s), on the outer side of the outer wall of the cavity, and between the threaded rod(s) and the metal plate within the cavity.

For example, the rod device may define a cavity at at least one, and preferably at a single one, of its ends, for the fixation to a metal support, e.g. a hub.

For example, the rod device may define a cavity at each of its protruding, mating, portions, for the fixation of a corresponding brush holder. The threaded rod(s) allows locking the brush holder onto the rod device.

The brush holder may be made of metal, and possibly covered with an insulating layer.

There is further provided a slip ring assembly comprising at least one brush assembly as described herein above and at least one conductive ring having a cylindrical surface.

The slip ring assembly may comprise a single ring/brush assembly, or more than one ring/brush assembly, e.g. three ring/brush assemblies if there are three phases.

If a plurality of ring/brush assemblies are provided, the slip ring assembly may comprise insulating means between the conductive rings, e.g. insulating disks between conductive rings.

The slip ring assembly and/or the brush assembly may be arranged so as to withstand transfer of high power via the slip ring and the brush(es), e.g. more than 10 kW, preferably more than 100 kW, advantageously more than 500 kW, e.g. more than 1 MW.

The slip ring assembly and/or the brush assembly may be arranged so as to withstand high voltages, e.g. more than 400 V, or more than 600V. For example, the voltage at the sliding contact may be in the range between 220 V and 12000 V, e.g. in the range between 220 V and 2700V, advantageously between 600 V and 1000V.

The slip ring assembly may comprise a single rod device or several rod devices.

For each rod device, a single brush holder may be mounted onto this rod device, or alternatively, several brush holders may be mounted onto this rod device, e.g. one for each phase. The brush holders may be mounted at different locations of the rod device, e.g. at different longitudinal positions.

The rod device extends in the direction of the second axis along the one or several conductive rings. If a plurality of conductive rings are provided, the conductive ring being aligned along the first axis, the rod device may advantageously extend along the plurality of conductive discs so s to be able to support a plurality of brush holders for a sliding contact with each one of the conductive rings.

In case the rod device comprises only a rod element, this rod element extends in the direction of the second axis along the one or several conductive rings. If a plurality of conductive rings are provided, the conductive ring being aligned along the first axis, the rod element may advantageously extend along the plurality of conductive discs so s to be able to support a plurality of brush holders for a sliding contact with each one of the conductive rings.

When the rod device is arranged such that a plurality of brush holders may be mounted onto this rod device, the rod device may arranged such that the part(s) of the rod device that is/are made of insulating material allow electrically insulating (possibly together with other insulating means such as a brush holder made of plastic) the at least one brush received in one brush holder of the plurality of brush holders from the at least one brush received in another brush holder of the plurality of brush holders. That is, the rod device allows insulating the brushes from the different brush holders, e.g. insulating phases.

For each brush holder of the plurality of brush holders, the brush assembly may define a corresponding path for the current flowing through the brush(es) received in this brush holder. The part(s) of the rod device that is/are made of insulating material may allow electrically insulating this paths from the paths of the other brush holder(s) of said plurality.

So, a plurality of brush holder may be mounted relatively close one from the other, thus allowing conciliating compactness and electrical insulation.

The part(s) of the rod device that is/are made of insulating material may allow electrically insulating means for power/data distribution corresponding to one brush holder or to one phase from the means for power/data distribution corresponding to another brush holder/phase.

In particular, when the rod device is arranged such that a plurality of brush holders may be mounted onto this rod device, the rod device being also arranged so as to support means for power/data distribution (e.g. wires, arcuate plates, metal inserts, . . . ), the rod device may be advantageously arranged such that the part(s) of the rod device that is/are made of insulating material allow (possibly together with other insulating means such as a brush holder made of plastic) insulating the means for power/data distribution corresponding to one brush holder from the means for power/data distribution corresponding to another brush holder.

For example, no conducting part of the rod device directly serves as a support for the flow of current, i.e., the current flowing through the brushes do not flow through the rod device or less of 10% of its intensity flows through the rod device. The rod device may for example be made entirely of insulating material, and the current flows via other means, e.g. wires, rockers, etc., that may be mounted onto the rod device, or not. In another example, the rod device may comprise metal parts, e.g. a metal rod, and parts made of insulating material between this metal part and the brush holders, the brush assembly being arranged such that no current flows through the metal part of the rod device.

In another embodiment, the rod device may comprise power/data distribution means, e.g. metal inserts or wires may be embedded into the rod device, as long as the power/data distribution means for one phase are electrically insulated (by part(s) of the rod device made of insulation material) from the distribution means corresponding to another phase.

The rod device may comprise a metal part, thus allowing to improve mechanical resistance, and/or to serve a direct support for the current.

In some embodiments, metal part(s) of the rod device may either play a mechanical role or an electrical role. For example, a cylindrical metal rod onto which one or a plurality of support elements may be mounted may not be used as a direct support for the flow of current, but it is advantageous because of its high mechanical resistance. According to another example, embedded wires, which do not really provide mechanical resistance, may be used so as to support the flow of current.

Unless other ranges are provided, by "substantially parallel", it is meant an angular deviation of less than 15°, advantageously less than 10°.

The invention is explained in further detail, and by way of example, with reference to the accompanying drawings wherein FIG. 1 schematically shows a system according to prior art.

FIG. 2 schematically illustrates another system according to prior art.

FIG. 4 illustrates an example brush assembly for the slip ring of FIG. 3.

FIG. 5 illustrates an example brush holder for a brush assembly according an embodiment of the invention.

FIG. 13 illustrates an example slip ring assembly according to a further embodiment of the invention.

FIG. 14 is a cut-away view of the slip ring assembly of FIG. 13.

The following are descriptions of illustrative embodiments that when taken in conjunction with the following drawings will demonstrate the above noted features and advantages, as well as further ones. In the following description, for purposes of explanation rather than limitation, illustrative details are set forth such as architecture, interfaces, techniques, element attributes, etc. However, it will be apparent to those of ordinary skill in the art that other embodiments that depart from these details would still be understood to be within the scope of the invention. Moreover, for the purpose of clarity, detailed descriptions of well known devices, circuits, tools, techniques and methods are omitted so as not to obscure the description of the present system. It should be expressly understood that the drawings are included for illustrative purposes and do not represent the scope of the present system. In the accompanying drawings, like reference numbers in different drawings may designate similar elements.

Identical references may be used on several figures to designate identical or similar elements.

Figure 1:
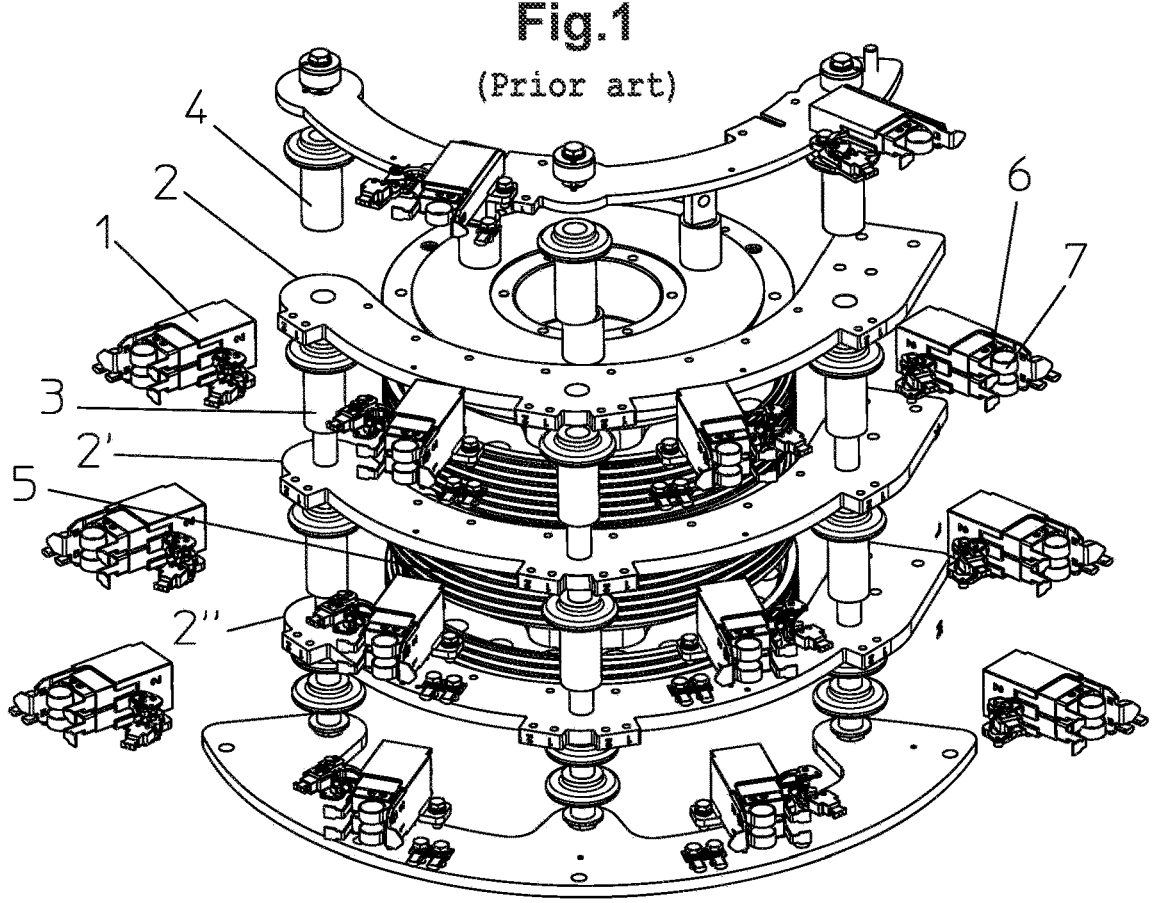
Figure 3:
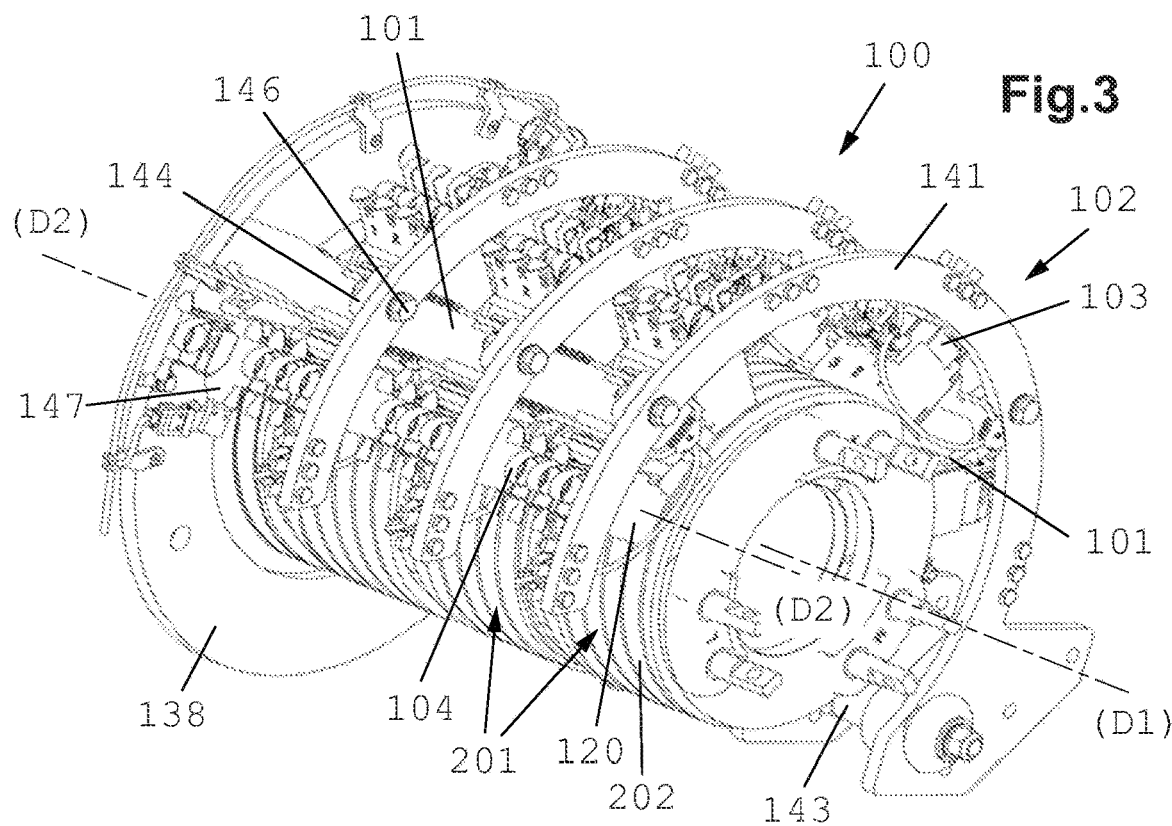
FIG. 3 illustrates an example slip ring assembly according to an embodiment of the invention.
Figure 2:
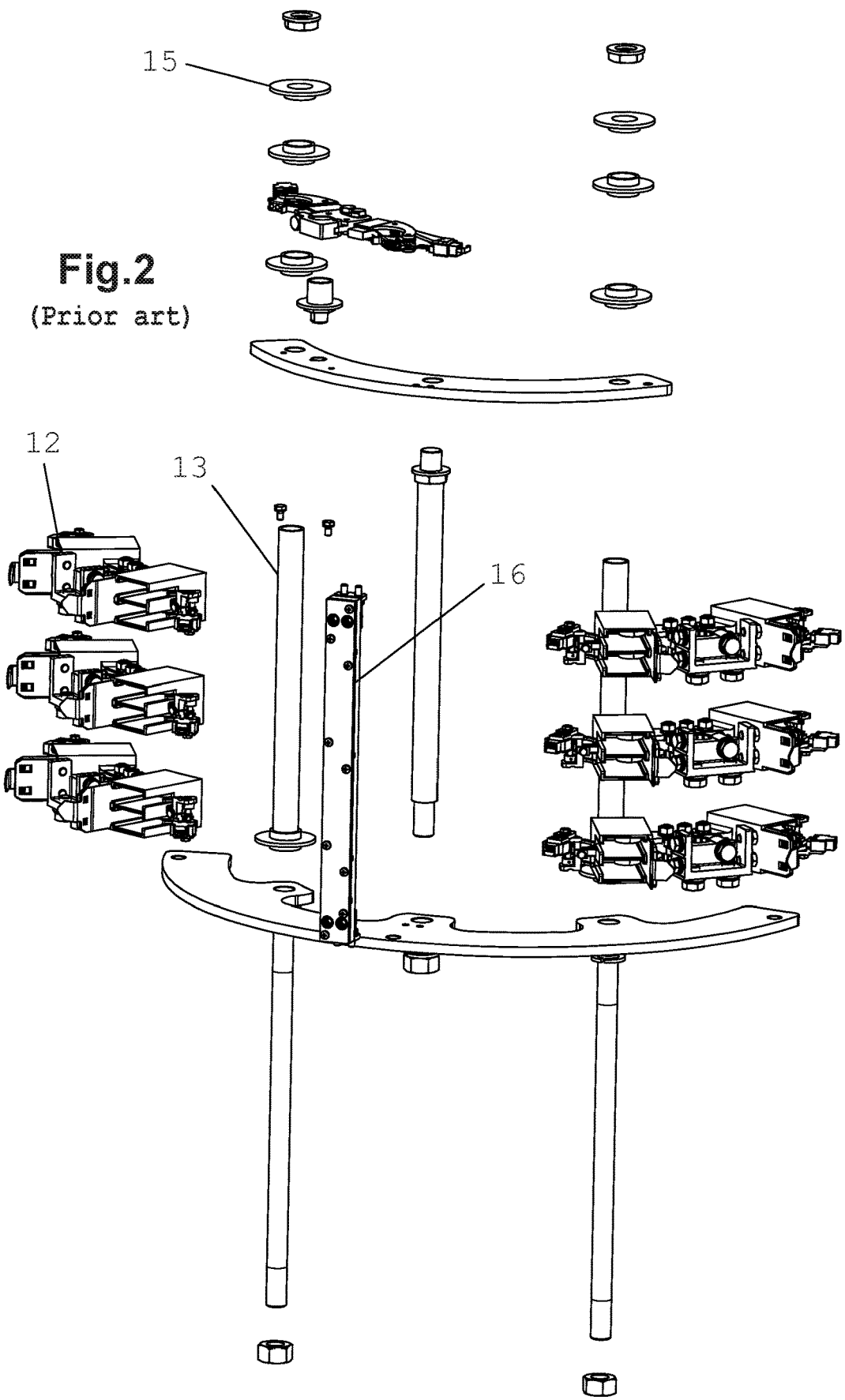

As illustrated on FIG. 3, a slip ring assembly 100 may comprise a plurality of conductive rings 201 and a brush assembly 102 to support and push brushes 103 against cylindrical surfaces 202 of the conductive rings 201.

Further, the brush assembly 102 is arranged to transmit power and/or data that flows through the conductive rings 201 and the brushes 103.

The conductive rings 201 are driven in rotation around a first axis (D1).

The brush assembly 102 comprises one or several, here two, rod devices, each rod device comprising only one rod element 101.

The rod elements 101 extend longitudinally along the conductive rings 201, in a direction that is parallel to the first axis (D1). Axis (D2) represents an axis along which a rod element 101 extends.

The rod elements 101 are made of plastic or other insulating material.

The rod elements 101 may be manufactured by injection molding.

The rod elements 101 extend longitudinally over the whole length of the slip ring, or at least on 80% of this length along the first axis (D1).

The brush assembly further comprises brush holders 120.

As can be seen on FIG. 4, each brush holder 120 defines at least one cage, here three cages, for receiving at least one brush 103, here three brushes 103.

The brushes may slide within their cages, in directions parallel or substantially parallel to the corresponding radial direction with regards to the first axis (D1). Axis (D3) represents an axis along which a corresponding brush may slide.

Spring elements 104 allow pushing the brushes 103 against a corresponding cylindrical surface (referenced 202 on FIG. 3).

The brush holders 120 are mounted onto a rod element 101.

Figure 7:
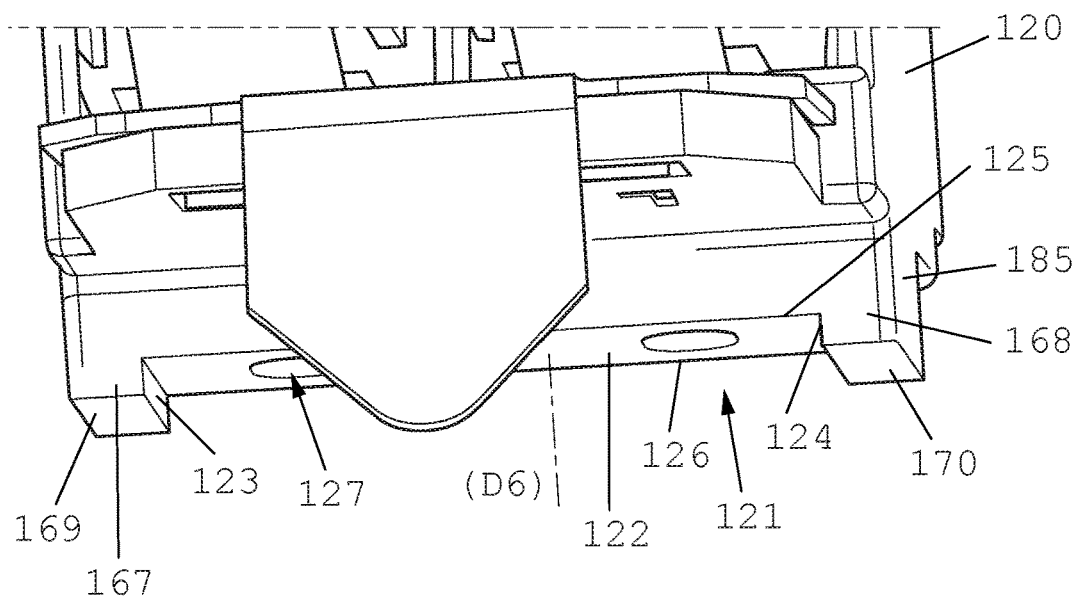
FIG. 7 shows a portion of a brush holder close to the brush holder of FIG. 5.

As shown on FIG. 5 and on FIG. 7, each brush holder 120 defines a recess 121 having a bottom wall 122 and two side walls 123, 124 upstanding with regards to this bottom wall 122.

The bottom wall 122 has a planar surface, perpendicular to a direction represented by axis (D6) shown on FIG. 7. So, when the brush holder 120 is mounted on the rod element 101, most of the local tangential directions going through the bottom wall 122 have a component parallel to this axis (D6).

Figure 6:
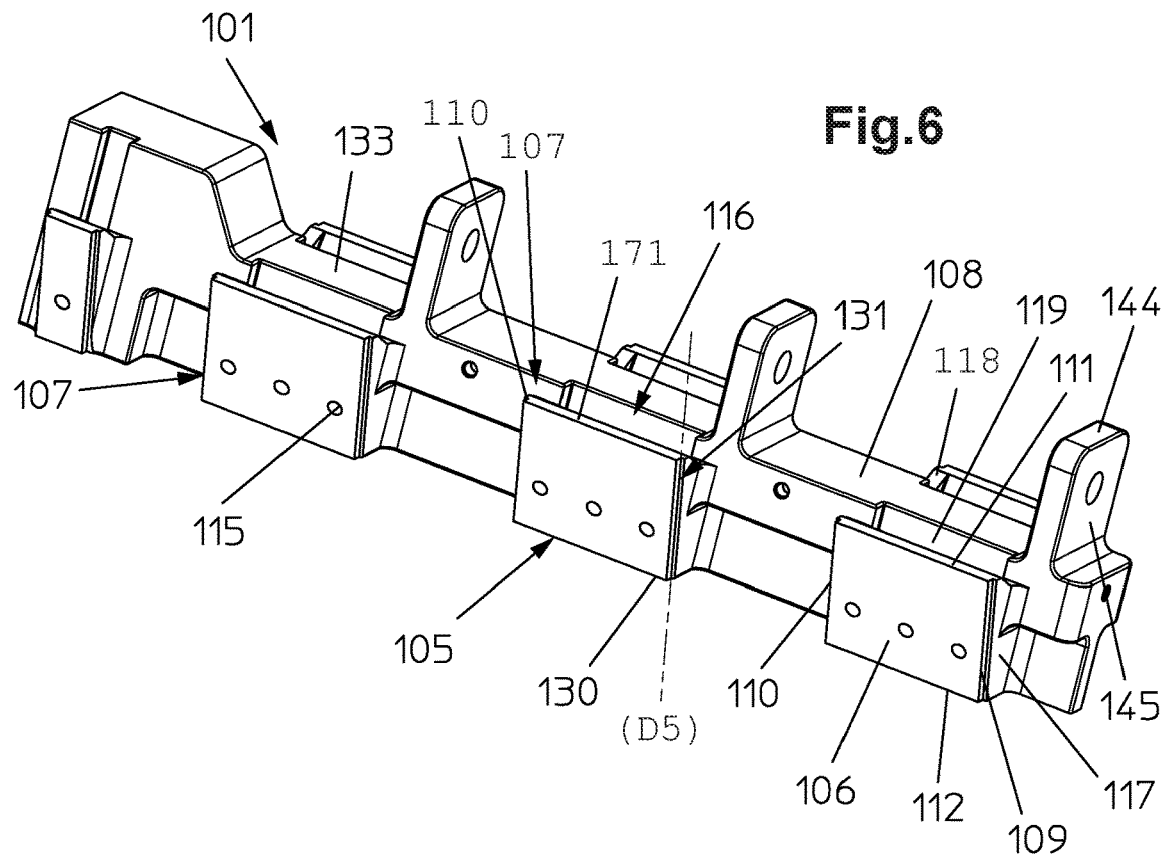
FIG. 6 illustrates an example rod element for a brush assembly according to the embodiment of FIG. 4.
Figure 8:
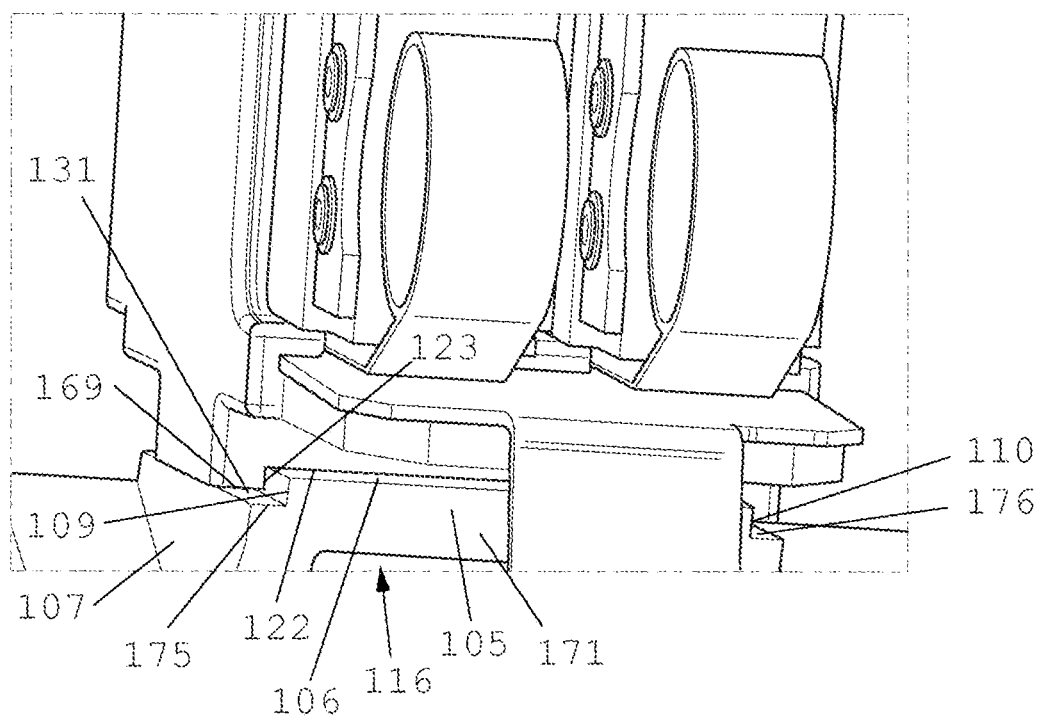
FIG. 8 is a detailed view of the brush holder of FIG. 7 and of a mating portion of a rod element for a brush assembly according to an embodiment of the invention.

As shown on FIG. 6 and on FIG. 8, the rod element 101 defines a plurality of mating portions, e.g. six mating portions 105. Each mating portion is to be received within a corresponding recess 121 of a brush holder.

Each mating portion 105 may be an end part of a protruding portion 107 protruding radially from a main rod section 108 of the rod element 101.

Each mating portion comprises an end surface 106, side walls 109, 110 opposing each other, an upper surface 111 and a lower surface 112.

In this example, the bottom wall 122 of the recess is planar, and the end surface 106 of the mating portion 105 is also planar.

The bottom wall 122 and the end surface 106 have similar rectangular shapes, with a small clearance, such that the mating portion could be received in the recess portion 121 while:
- the walls 122 and 106 being in planar contact with each other or at least very close to each other, e.g., less than 2 millimeters,
- the walls 110 and 124 being in contact with each other or at least very close to each other, e.g., less than 2 millimeters, and
- the walls 109 and 123 being in contact with each other or at least very close to each other, e.g., less than 2 millimeters.

Since the walls 106 and 122 are planar, extend in the longitudinal direction and are in planar contact or very close to each other, tangential movement is prevented.

The walls 123, 124 prevent longitudinal movement of the brush holder 120 with regards to the rod element 101.

The brush holder may thus be pre-positioned relatively easily onto the rod element, without needing to adjust its longitudinal position not its angular position.

As can be seen of FIG. 5, the walls 122, 123, 124 all extend along a same direction, illustrated by axis (D4).

This direction may for example be parallel or substantially parallel to the sliding direction of the brush 103, illustrated by axis (D3).

With reference to FIG. 6, the walls 109, 110 may also extend along a same direction, illustrated by axis (D5).

Further, the recess 121 is opened at the upper and lower edges 125, 126 of the bottom wall 122.

Therefore, the mating portion 105 may be inserted at one of these openings of the recess 121.

And further, the mating portion 105 may slide with regards to the recess.

As can be seen on FIG. 6 and on FIG. 8, the mating portion is defined within a thick wall 171. This thick wall defines two notches 131 at its corners. Each notch is delimited by one of the walls 109, 110 and by another, perpendicular wall 175, 176.

The notches 131 extend in a direction parallel to the axis (D5).

As can be seen on FIGS. 7 and 8, the side walls 123, 124 are each walls of a corresponding tongues 167, 168 extending in a direction parallel to the axis (D4), and whose walls 169, 170 are in planar contact with the walls 175, 176 of the notches 131, thus providing enhanced guiding.

As illustrated on FIGS. 5 and 7, the recess 121 may be defined within a protruding part 185 that protrudes from the rest of the brush holder 120.

Now referring to FIG. 4, locking means 113, 114 allows preventing this sliding movement of the mating portion 105 within the groove formed by the recess 121, thus locking the brush holder 120 with regards to the rod element 101.

In this example, the locking means comprise screws 114, whose threaded rods go through corresponding holes 115 (on FIG. 6) defined within the rod element 101 and through corresponding holes 127 (on FIG. 5 and on FIG. 7) defined at the bottom wall 122 of the brush holder 120.

The holes 127 at the brush holder (and/or the holes at the rod element) may be oblong so as to allow radial adjustment. In an alternative, not illustrated, embodiment, a plurality of holes having different radial positions may be provided so as to allow radial adjustment.

In this example, the head of the screw 114 is at the rod element side.

The rod element 101 defines a cavity 116 within the protruding portion 107. This cavity is defined by the thick wall 171 defining the mating portion 105, by two side walls 117, 118 upstanding from this thick wall 171 toward the main rod section 108, by a wall 119 of the main rod section 108 and by a lower wall 130.

A metal plate 132 (on FIG. 4) may be received within this cavity 116.

The lower wall 130 prevents the metal plate 132 from falling on the slip ring when the screws 114 are not set yet.

The plate 132 defines holes for the screws 114 and allows protecting the rod element 101 from direct contact with the heads 113 of the screws 114. Further, due to the metal-metal contact between the screws 114 and the plate 132, the fixation is enhanced.

In this example, three screws 114 are provided for each brush holder 120.

In the embodiment of FIGS. 3, 4, and 6, the rod elements 101 are arranged for mechanically supporting partially circular conductive plates 141. More precisely, the rod elements 101 define upstanding walls 144, extending in planes perpendicular to the second axis (D2). These walls 144 define holes 145 for receiving a length of a bolt, thus allowing to support a plate 141.

Figure 9:
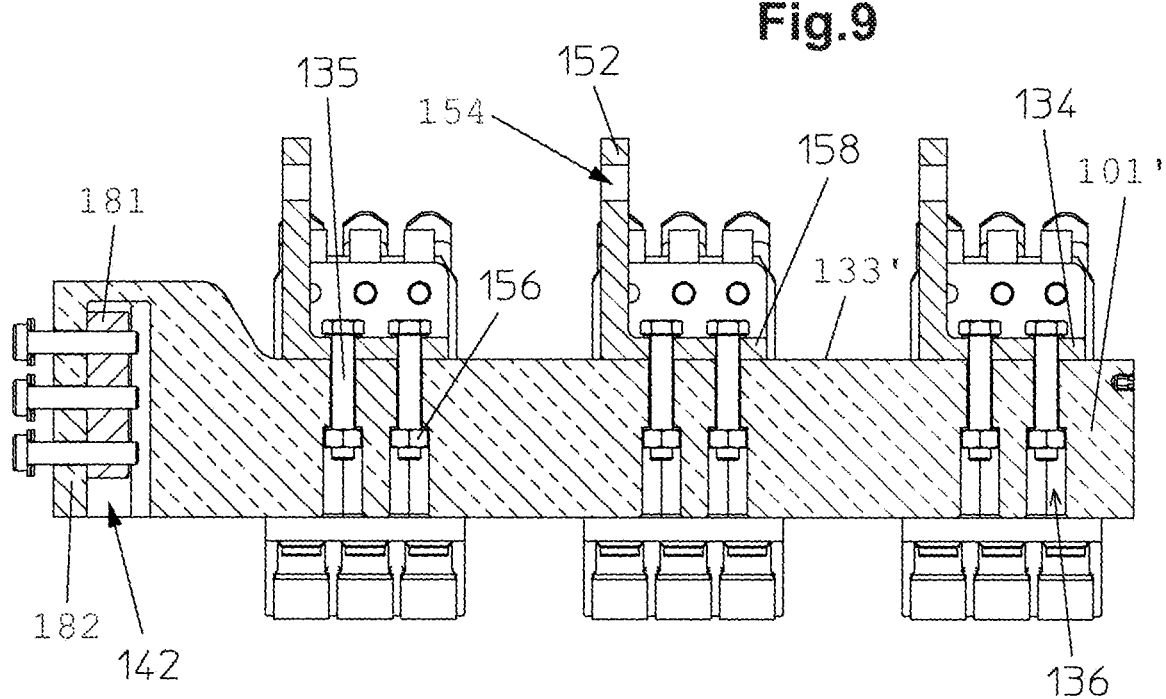
FIG. 9 is a cut-away view of a brush assembly according to an embodiment of the invention.
Figure 10:
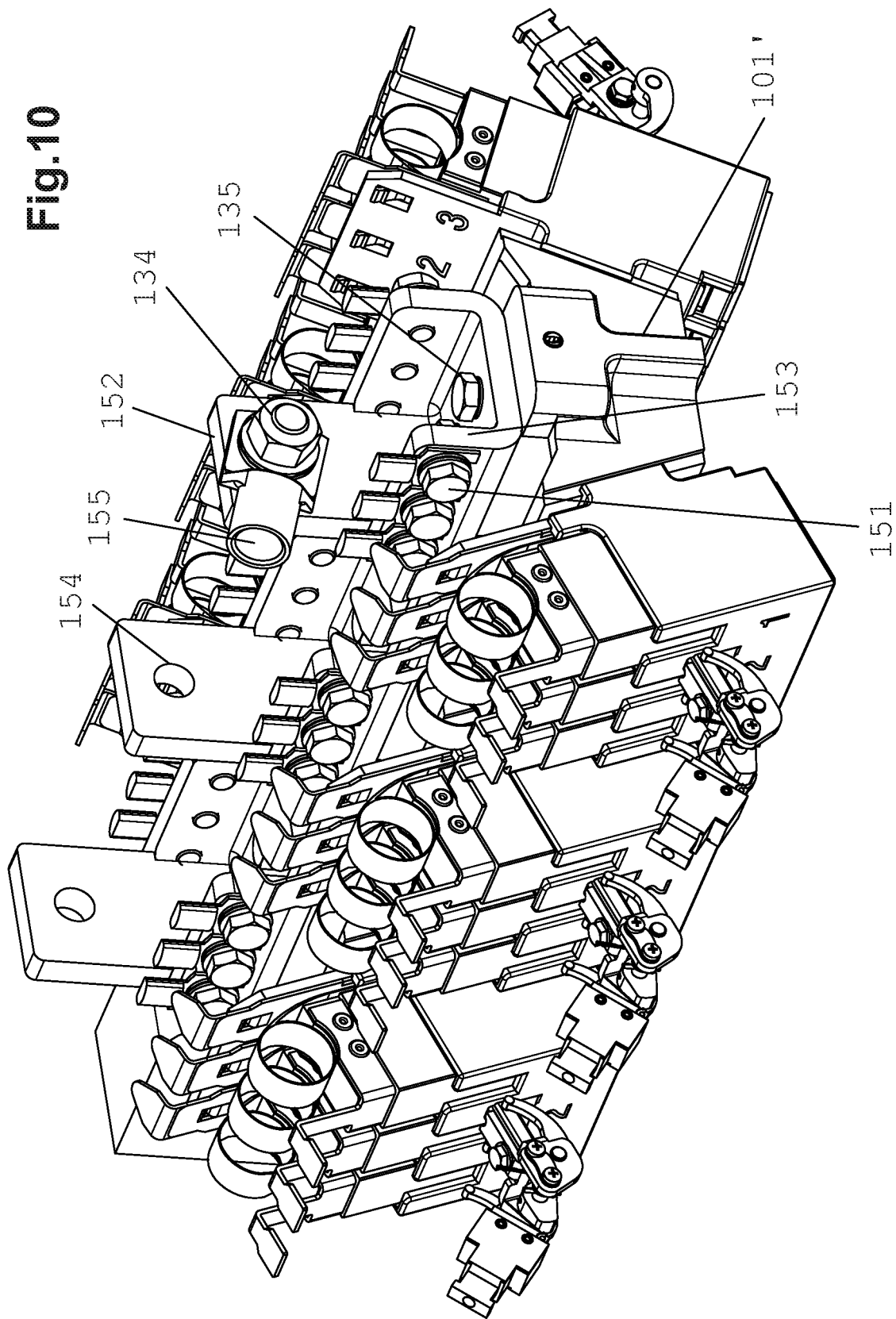
FIG. 10 shows the brush assembly of FIG. 9.
Figure 11:
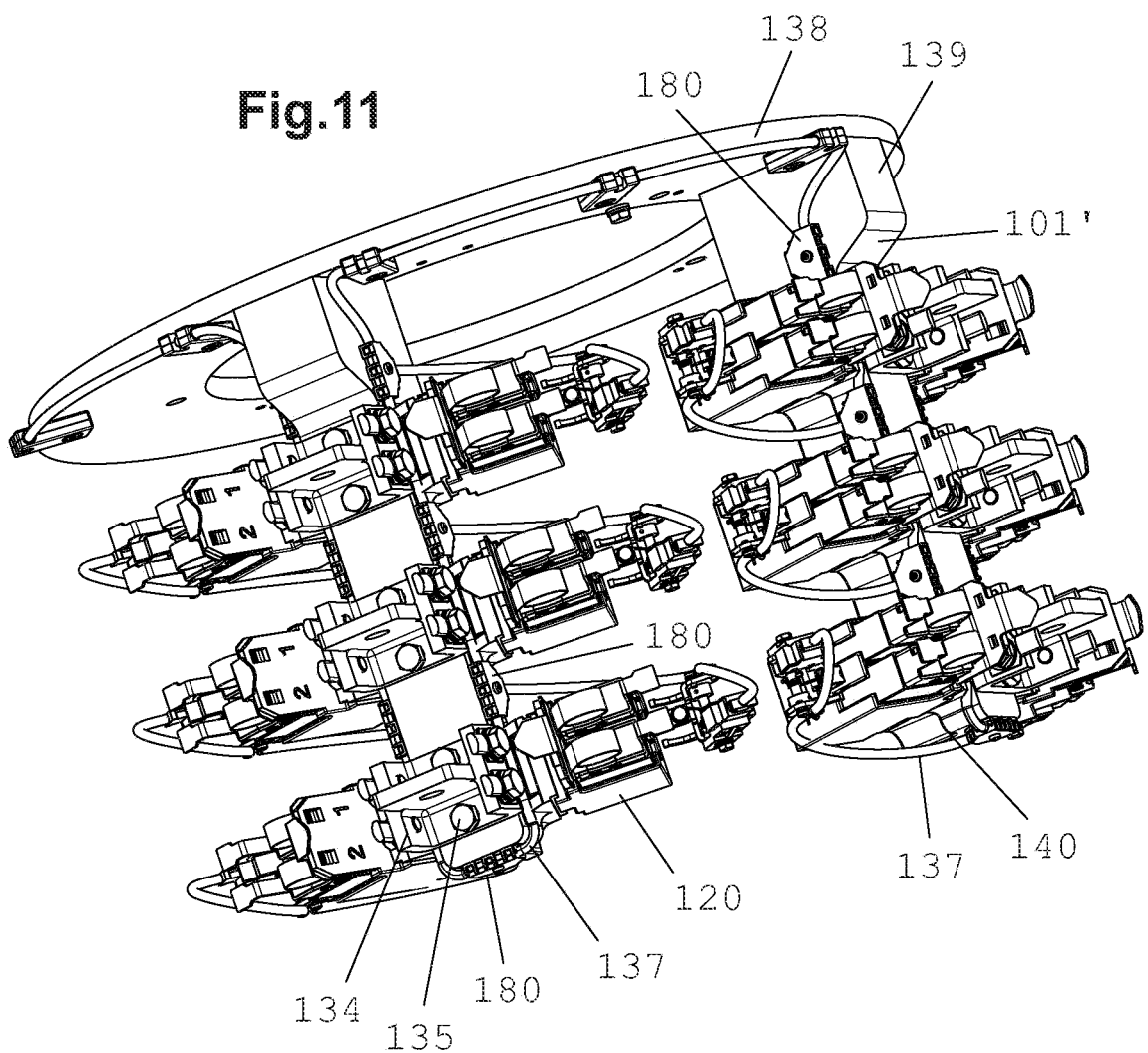
FIG. 11 shows a brush assembly according to the embodiment of FIG. 9.

In the embodiment of FIG. 9-11, the rod element 101' is slightly different than in the embodiment of FIG. 4, because its planar portion 133' extends over almost all the length of the rod element 101', e.g. over substantially 80% of its length.

Fixing means, e.g. bolts 135 and nuts 156, may allow locking a connection element 134 onto the planar portion 133'.

Each nut 156 may be received within a cavity 136, thus avoiding the nut to protrude from the body of the rod element.

Figure 12:
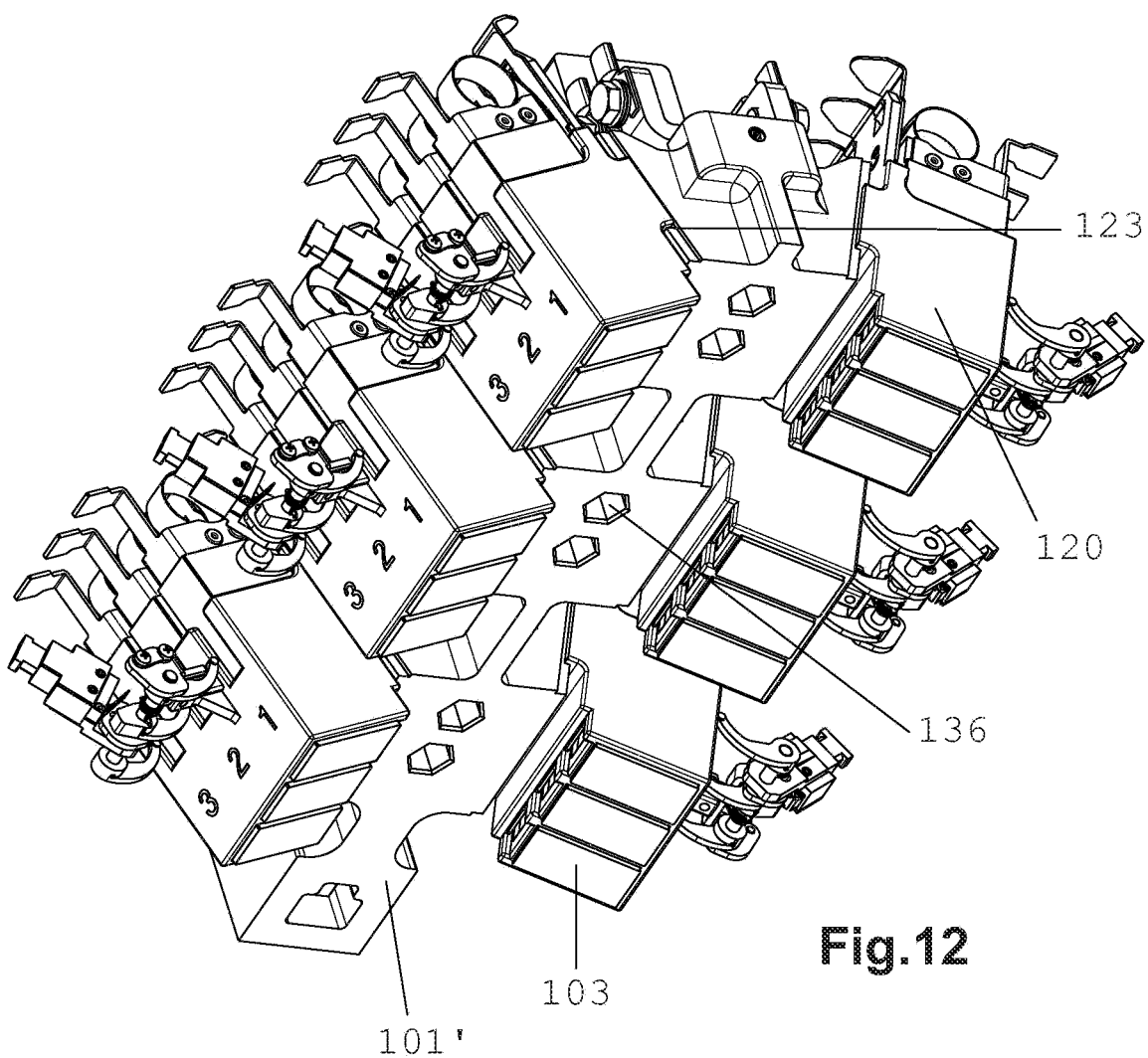
FIG. 12 illustrates the brush assembly according to the embodiment of FIG. 9.

A similar cavity 136 is shown on FIG. 12.

This cavity has a section adapted to mate with a corresponding nut, e.g. a hexagonal section, thus preventing rotational movement of the nut 156 within the cavity 136.

The connection element 134 may be made of conductive material, e.g., metal, e.g. brass. It comprises a bottom part 158 that lies onto the planar portion 133' of the rod element, side walls 153 forming a U with the bottom part 158 (see FIG. 10), and an upstanding portion 152 that is perpendicular to the side walls 153.

The connection element 134 define holes on its side walls 153 for fixing electrical connections 151 to brush terminals, the corresponding wires being not represented in FIG. 10.

The connection element 134 further comprises the upstanding main wall 152, in electrical contact with the side walls 153, and that defines a hole 154 for an electrical connection 155, thus allowing to collect the current that flows through the corresponding six brushes (or feed these six brushes).

As illustrated on FIG. 11, the rod element 101' may define holes (not shown) for fixing cable guiding elements 180, e.g. by means of screws.

Wires 137 can be guided through these cable guiding elements 180.

Such cabling may advantageously be done prior to the installation.

The wires 137 may be connected to a sensor, e.g. a wear sensor, a temperature sensor, etc. The wires may thus be adapted for signals.

Further, the brush assembly of FIG. 11 comprises a single ring support 138, onto which the rod elements 101' are fixed at a single one 139 of their ends 139, 140.

The rod element may be thicker at this single end 139 so as to withstand more efforts.

The ring support 138 may be made of metal, e.g., steel.

As shown of FIG. 9, fixing means comprise a cavity 142 for receiving a metal plate 181.

The outer wall 182 of the cavity 142 and the metal plate may define holes for threaded holes of screws 114 to go through.

A portion of the metal support may be received between the heads of the screws 141 and the outer surface of the outer wall 182. This portion of the metal support may also define holes for the screws, thus allowing locking the rod element 101' with regards to the ring support 138 by means of metal-metal contacts.

Returning back to FIG. 3, the slip ring assembly comprises three partially circular segment conductive plates 141, that are parallel to each other.

These plates 141 may be made of metal.

Wires 142 and electrical connections 150 allow connecting brush terminals to corresponding conductive plates 141.

The partially circular segment conductive plates 141 are partly supported by an insulation support rod 143 extending perpendicularly from the plane of the plates 141, in a direction that is parallel to axis (D1).

The rod 143 is also mounted on the ring support 138, at a single one of its ends.

In the embodiment of FIG. 4, the rod element 101 defines three walls 144 upstanding from the planar portions 133. Each wall 144 defines a hole 145 for supporting a mechanical connection, e.g., a bolt and nut 146, for fixing a partially circular segment conductive plates 141 (see FIG. 3). The rod elements 101 thus also support the conductive plates 141.

As shown on FIGS. 3 and 4, an additional brush holder 147 may be provided for earthing. This additional brush holder 147 may define a recess (not shown) and the rod element 101 may define an additional mating portion 148 dedicated to this additional brush holder 147.

Now referring to the embodiment of FIG. 13 and FIG. 14, a slip ring assembly 100" may comprise rod devices 301 for supporting brush holders 120". In this embodiment, each rod device 301 is made of a plurality of pieces assembled together.

Each rod device comprises a cylindrical steel rod 302 and a plurality of plastic support elements 303, e.g. three support elements 303 per steel rod 302.

Each support element 303 is clamped onto the corresponding steel rod 302.

Each support element 303 is arranged so as to mate with two brush holders 120", the arrangement being similar as the one of FIG. 3. Each support element 303 may define a mating portion, similar to the mating portions 105, that is received into a recess of a corresponding brush holder.

Each brush holder allows accommodating two brushes 103". Each support element 303 corresponds two pairs of brushes, that is one pair of brushes on each side of the corresponding rod 302.

The support element 303 is arranged for mechanically supporting partially a circular conductive plate 141". More precisely, the support elements 303 define upstanding walls 144", extending in planes perpendicular to longitudinal axis (D2') of the corresponding rod 302. These walls 144" define holes for receiving a length of a bolt 304, thus allowing supporting a plate 141.

The rod elements 101, 101' and the support elements 303 are made of composite or plastic, or in any material whose is insulating enough. The rod elements 101, 101' and the support elements 303 are arranged so as to support brush holders 120, by means of the mating portions 105, and to (at least partly) support power/data transmission means such as the plates 141, the connection elements 134, wires 137, etc.

The rod device ensures mechanical support, and electrical connection has a separate path (e.g. partially circular plates 141 that do not ensure mechanical support except possibly for wires), thus providing electrical separation by means of an appropriate creepage distance, that can be obtained depending on the material of the rod element.

In a not illustrated embodiment, a rod device may comprise a metal part, e.g. a metal core or metal wires, that is at least partially covered by insulating material cast onto this metal part.

The invention claimed is:

1. A brush assembly for a slip ring assembly of a rotating electrical machine, for supporting at least one brush electrically contacting a cylindrical surface of a conductive ring of the slip ring assembly, one of the brush assembly or the conductive ring having a rotational movement around a first axis extending along a longitudinal direction, the brush assembly comprising:
at least one brush holder, said brush holder defining at least one cage into which the at least one brush may be slidably received, said at least one brush holder comprising a spring element arranged and installed so as to apply a force onto the at least one brush when said at least one brush is received in the at least one cage so as to push said at least one brush against the cylindrical surface of the conductive ring, said force having a component that is parallel to a radial direction with regard to the first axis; and
at least one rod device for supporting the brush holder,
wherein the at least one rod device comprises an elongated member extending along a second axis that is parallel to the first axis, and comprises at least a part that is made of insulating material,
wherein one of the at least one rod device and the at least one brush holder defines at least one recess,
wherein an other one of the at least one rod device and the at least one brush holder comprises a mating portion that is sized to be received into the recess,
wherein said recess is defined by a first wall disposed for abutment against the mating portion when, said mating portion being received in said recess, the brush holder is driven along said rod device in a longitudinal direction parallel to the second axis,
wherein said recess is defined by a second wall disposed for abutment against mating portion when, said mating portion being received in said recess, the brush holder is driven in a tangential direction around the second axis.

2. The brush assembly according to claim 1, wherein the second wall is a bottom wall of the recess, and wherein the first wall upstands from said bottom wall.

3. The brush assembly according to claim 1, wherein the at least rod device and the at least one brush holder define a guide for guiding the at least one brush holder in a direction that has a radial component with regards to the first axis.

4. The brush assembly according to claim 3, wherein the guide comprises a groove.

5. The brush assembly according to claim 1, wherein the at least one brush holder defines the at least one recess and the at least one rod device comprises the mating portion.

6. The brush assembly according to claim 1, wherein the at least one rod device is arranged such that a plurality of brush holders of the at least one brush holder may be mounted onto said at least one rod device, and
wherein the at least one rod device is arranged such that the one or more parts of the rod device that are made of insulating material to allow electrical insulating of the at least one brush received in one brush holder of the plurality of brush holders from the at least one brush received in another brush holder of the plurality of brush holders.

7. The brush assembly according to claim 1, wherein the part of the at least one rod device that is made of insulating material is injection molded plastic.

8. The brush assembly according to claim 1, wherein the rod device is arranged so as to support electrical connections for power and/or data distribution.

9. The brush assembly according to claim 8, wherein the electrical connections for power and/or data distribution are integrated into the at least one rod device.

10. The brush assembly according to claim 1,
wherein the brush assembly further comprises at least one metal plate that defines at least one hole,
wherein the at least one rod device defines a cavity adapted to receive said at least one metal plate,
wherein an outer wall of the cavity defines at least one through-hole, at one or more positions corresponding to one or more positions of the at least one hole of the metal plate when the metal plate is received within said cavity.

11. The brush assembly according to claim 1, wherein the brush assembly further comprises at least one at least partially circular conductive plate that extends in a plane perpendicular to a line that has a component parallel to the first axis and the second axis.

12. The brush assembly according to claim 1, wherein the elongated member comprises a single rod element extending along the second axis.

13. The brush assembly according to claim 12, wherein the single rod element comprises the mating portion that is sized to be received into the recess.

14. The brush assembly according to claim 1, wherein the elongated member comprises a rod extending longitudinally along the second axis and onto which at least one support element is removably mounted.

15. The brush assembly according to claim 1,
wherein the at least one rod device comprises, at a single end, connectors arranged for fixation onto a support,
wherein the connectors are arranged so as to allow the fixation at a single location and with a single angle with regard to the support.

16. The brush assembly according to claim 1, wherein each of the at least one rod device supports a plurality of brush holders of the at least one brush holder adjacent to one another in a longitudinal direction parallel to the second axis.

17. The brush assembly according to claim 1,
wherein each of the at least one rod device, on a first side, supports a first plurality of brush holders of the at least one brush holder adjacent to one another in a longitudinal direction parallel to the second axis, and
wherein each of the at least one rod device, on a second side that is opposite to the first side, supports a second plurality of brush holders of the at least one brush holder adjacent to one another in a longitudinal direction parallel to the second axis.

18. The brush assembly according to claim 17, wherein the first plurality of brush holders and the second plurality of brush holders are symmetrically attached to each of the at least one rod device.

19. A slip ring assembly of a rotating electrical machine comprising
at least one conductive ring having a cylindrical surface, and
a brush assembly for supporting at least one brush electrically contacting the cylindrical surface of the at least one conductive ring, one of the brush assembly or the at least one conductive ring having a rotational movement around a first axis extending along a longitudinal direction, the brush assembly comprising:
at least one brush holder, said brush holder defining at least one cage into which the at least one brush may be slidably received, said at least one brush holder comprising a spring element (104) arranged and installed so as to apply a force onto the at least one brush when said at least one brush is received in the at least one cage so as to push said at least one brush against the cylindrical surface of the conductive ring, said force having a component that is parallel to a radial direction with regard to the first axis; and
at least one rod device for supporting the brush holder,
wherein the at least one rod device comprises an elongated member extending along a second axis that is parallel to the first axis, and comprises at least a part that is made of insulating material,
wherein one of the at least one rod device and the at least one brush holder defines at least one recess,
wherein an other one of the at least one brush holder and the at least one rod device comprises a mating portion that is sized to be received into the recess,
wherein said recess is defined by a first wall disposed for abutment against the mating portion when, said mating portion being received in said recess, the brush holder is driven along said rod device in a longitudinal direction parallel to the second axis,
wherein said recess is defined by a second wall disposed for abutment against mating portion when, said mating portion being received in said recess, the brush holder is driven in a tangential direction around the second axis.

* * * * *